United States Patent [19]

Neal et al.

[11] 4,117,671

[45] Oct. 3, 1978

[54] NOISE SUPPRESSING EXHAUST MIXER ASSEMBLY FOR DUCTED-FAN, TURBOJET ENGINE

[75] Inventors: Brian Neal, Seattle; Lars Q. Andersen, Bothell, both of Wash.

[73] Assignee: The Boeing Company, Seattle, Wash.

[21] Appl. No.: 755,837

[22] Filed: Dec. 30, 1976

[51] Int. Cl.² ............................ F02K 1/26; F02K 3/04
[52] U.S. Cl. ........................................ 60/262; 60/264;
239/127.3; 239/265.17
[58] Field of Search ................................. 60/262, 264;
239/265.17, 127.3

[56] References Cited

U.S. PATENT DOCUMENTS

| 3,048,376 | 8/1962 | Howald et al. | 60/262 |
| 3,053,340 | 9/1962 | Kutney | 60/262 |
| 3,508,403 | 4/1970 | Neitzel | 60/262 |
| 3,587,777 | 6/1971 | Ellis | 60/262 |

*Primary Examiner*—Robert E. Garrett
*Attorney, Agent, or Firm*—Christensen, O'Connor, Johnson & Kindness

[57] ABSTRACT

To suppress jet noise emanating from a ducted-fan turbojet engine, an improved exhaust mixer assembly is disclosed that is mounted between the engine and the exhaust nozzle and that mixes the flow of high-velocity primary gases (turbine exhaust) with the lower-velocity air from the fan duct in a manner that achieves a significant reduction in the proportion of noise-causing high velocity gases while maintaining approximately the same thrust from the nozzle as other mixer-equipped engines. The mixer assembly includes an annular sleeve, a bulb-shaped plug disposed concentrically within the sleeve, and an annular corregugated mixer duct coaxially positioned between the plug and sleeve wherein these components are arranged so as to receive the primary and fan flows and separately redirect these flows within the assembly so that the flow of primary gases is rearwardly divergent while the flow of fan air is rearwardly convergent. As the primary and fan flows pass through a mixing plane at the aft terminus of the mixer duct, they intersect in a crossing pattern resulting from their divergent-convergent flow paths which yields faster and more complete mixing of the flows before they are discharged from the nozzle. The shaping and dimensioning of the sleeve, plug, and mixer duct are such that optimum mixing, and thus maximum suppression of noise, are achieved without introducing any excessive pressure losses in the mixer assembly and nozzle that otherwise would significantly diminish thrust.

8 Claims, 5 Drawing Figures

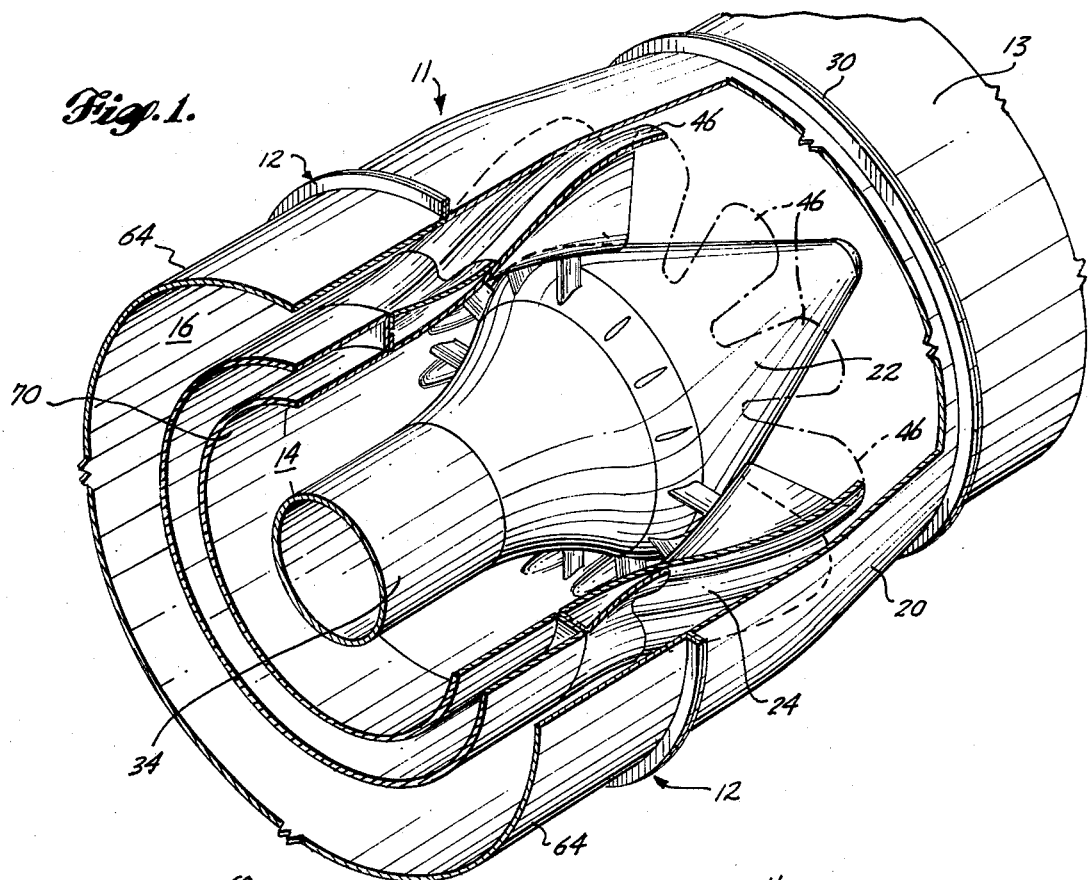
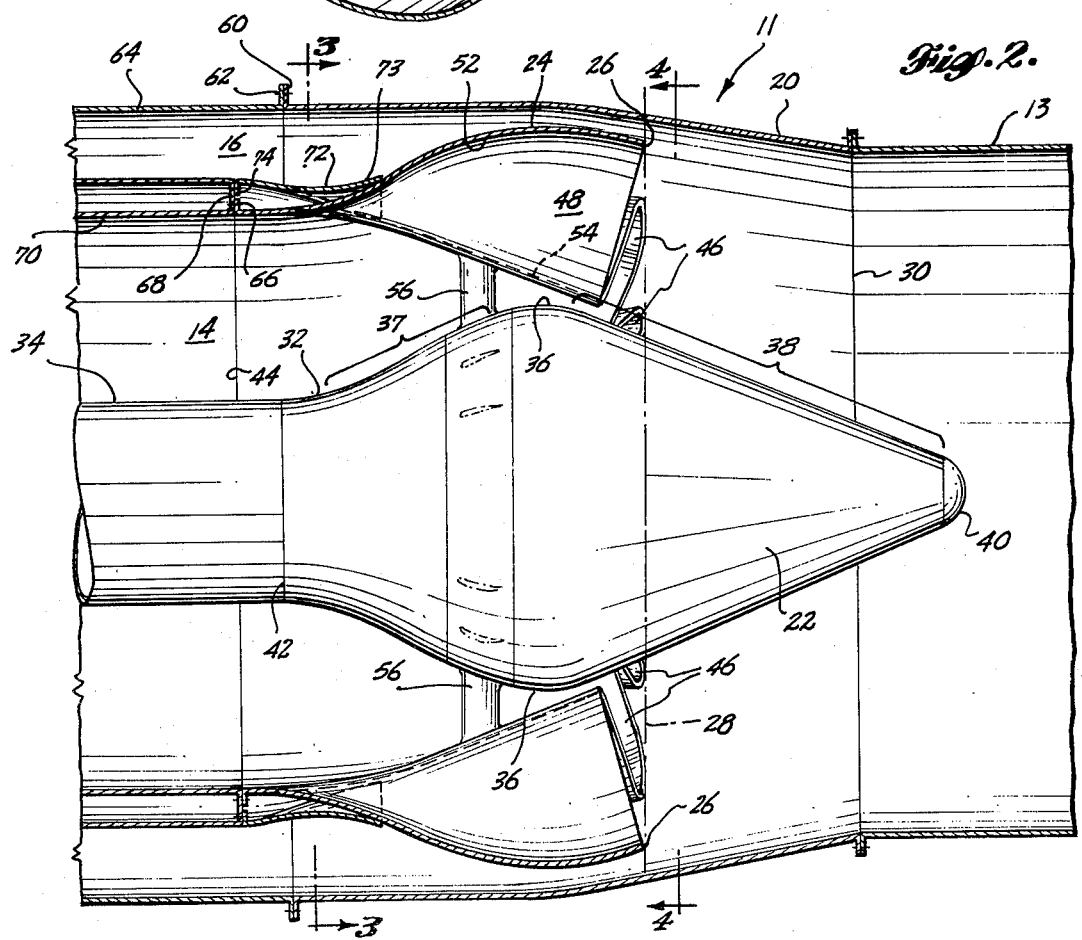

NOISE SUPPRESSING EXHAUST MIXER ASSEMBLY FOR DUCTED-FAN, TURBOJET ENGINE

FIELD OF THE INVENTION

The invention generally relates to the suppression of noise in ducted-fan turbojet engines and more particularly to the suppression of jet noise, ie., noise that is caused by the discharge of high velocity gases into the atmosphere, by mixing the primary flow which contains the greatest concentration of high velocity gases with the lower velocity fan flow prior to their discharge.

BACKGROUND OF THE INVENTION

As discussed in U.S. Pat. No. 3,710,890, the perceivable noise that emanates from a jet engine can be classified according to its source. One source of noise, called jet noise, is attributed to a shearing action of gas molecules as they are discharged at high pressure, and thus high velocities, into the surrounding atmosphere. The intensity of the resulting noise is proportional to the velocity of the discharged gases. Because of the extremely high velocity of gases in the primary flow, jet noise from this source is one of the most objectionable noise components. An effective technique for suppressing jet noise is to equip the ducted-fan, turbojet engine with a mixing device, in which the fan and primary flows are mixed prior to their discharge into the atmosphere in order to convert the high-velocity primary flow and the low-velocity fan flow into a relatively homogeneous mixed flow of intermediate velocity. Neglecting losses introduced by the mixing structure of such a device, the thrust produced by the mixed flow is theoretically greater than the total thrust produced by the sum of the primary flow plus the fan flow.

However, in actuality, the losses introduced by the mixing device cannot be ignored and indeed such losses constitute a practical limitation on the use of his technique to reduce noise. In particular, the mixer equipped engine incurs increases in pressure losses in two ways. First, the mixer duct which is used in the mixing device increases the structural surface area that the primary and fan flows encounter. This in turn means an increase in the surface friction drag to which the primary and fan flows are subjected. The friction drag robs momentum from the gas molecules before they reach the discharge opening of the nozzle and thus reduces thrust. Secondly, the mixing device can create secondary flows e.g., swirling motion, and/or flow separations, thereby causing further loss of pressure and hence thrust.

Also, it has been the experience of engine designers that existing designs for mixing devices cannot be simply modified to enhance the degree of mixing (and thus maximize the noise suppression) without recognizing and accounting for possible adverse effects on the thrust performance. For example, the mixing of the primary and fan flows can normally be enhanced by extending the nozzle length to allow greater blending of the turbine gases and fan air after they pass through the mixing device and before they are discharged from the aft terminus of the nozzle. However, such an increase in nozzle length is accompanied by greater internal surface area of the nozzle and thus by more pressure loss due to friction drag. Additionally, attempts have been made to improve the thoroughness of the mixing by various forms of baffling and other internal mixer structures, but it has usually been found that although the mixing has been improved, there has been such a disruption of the rearward flow of the gases that unacceptably high pressure losses result.

Accordingly, it is an object of the invention to enhance the degree of mixing of primary and fan flows in a mixer equipped, ducted-fan, turbojet engine in order to reduce jet noise while at the same time preserving most of the gains in thrust that are expected, in theory, to result from an idealized mixer operation.

SUMMARY OF THE INVENTION

Briefly, the present invention is embodied in an exhaust mixer assembly for a ducted-fan, turbojet engine wherein the assembly comprises a sleeve, a bulbous plug that has an axis of symmetry and is disposed coaxially within the sleeve and a mixer duct of generally annular shape, which is corrugated, in a manner described more particularly herein, and is disposed coaxially between the plug and the sleeve. The sleeve, plug and mixer duct are shaped, dimensioned and arranged so that when the mixer assembly is attached to the discharge end of the engine and a nozzle is attached to the aft end of the mixer assembly, primary flow from an annular outlet of the engine's turbine and fan flow from an annular fan duct outlet coaxially surrounding the turbine outlet, are channeled through the mixer assembly and thereafter discharged from the nozzle in the following manner. The bulk of the primary flow is directed rearwardly and then is gradually redirected to diverge radially outwardly such that when the primary flow crosses the aft terminus of the mixer duct, the bulk of the primary flow is flowing rearwardly and radially outwardly at a predetermined angle of divergence with respect to the axis of the assembly. The bulk of the fan flow is directed rearwardly and then is gradually redirected to converge radially inwardly such that when the fan flow crosses the aft terminus of the mixer duct, the bulk of the fan flow is flowing rearwardly and radially inwardly at a predetermined angle of convergence with respect to the axis of the assembly.

The sum of these predetermined angles of divergence and convergence is made as large as possible, within the constraints discussed herein, so that the angle of intersection of the two flows is maximized. This results in optimum mixing of the flows. At the same time the mixer duct and the plug are contoured relative to the axis of the assembly so as to maintain non-separated flow of the primary gases and fan air along the surfaces of the assembly lying aft of the mixer duct. It has been found that by constructing the sleeve, plug and mixer duct in this manner and as more fully described herein, that the angle of intersection between the primary and fan flows, can be increased to a larger value than thought possible without causing separated flow and accompanying loss of thrust. Since the degree of mixing is dependent on the angle of intersection between the flows, the significantly increased angle of intersection maximizes mixing and hence reduces the amount of objectionable jet noise produced by the engine while at the same time taking full advantage of the enhancement of the thrust due to mixing.

To provide a complete disclosure of the invention, reference is made to the appended drawings and following description of a particular and presently preferred embodiment.

BRIEF DESCRIPTION OF DRAWINGS

FIG. 1 is an isometric view, partly cut away for clarity, of one embodiment of the mixer assembly of the invention.

FIG. 2 is a longitudinal, vertical sectional view of the mixer assembly shown in FIG. 1.

DETAILED DESCRIPTION

Figure 5:
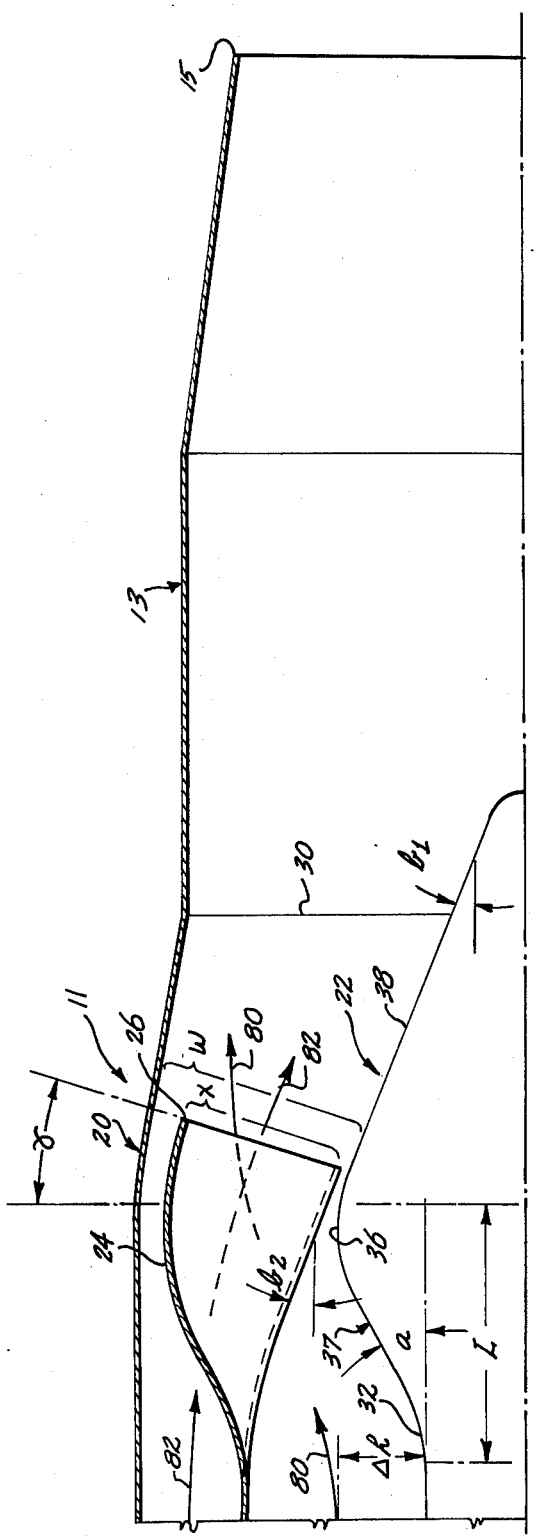
FIG. 5 is a diagrammatic illustration of the mixer assembly with a nozzle attached to the aft end thereof and with arrows indicating the paths of the primary and fan flows.

With reference to FIG. 1, mixer assembly 11 of the present invention is adapted for attachment to an end 12 of a ducted fan turbojet engine. Only the end 12 of the engine and portions of the engine structure that define the annular turbine outlet 14 and the annular fan duct outlet 16 are shown in the drawings. Assembly 11 when so attached to the engine receives the hot, relatively high velocity gases of the primary flow from turbine outlet 14 and mixes these primary flow gases with the cooler, relatively low velocity air flow that is discharged from the fan duct outlet 16 that coaxially surrounds duct 14. The mixed flows then pass through a nozzle 13 (only a forward portion of which is shown in FIG. 1) and are discharged from an aft end 15 of nozzle 13 as best shown in FIG. 5. Nozzle 13 is attached to assembly 11 at flange joint 30.

Assembly 11 includes a generally hollow cylindrical sleeve 20, a bulb-shaped plug 22 and a generally annular, corrugated mixer duct 24. Plug 22 is concentrically mounted within sleeve 20 and mixer duct 24 is coaxially arranged between sleeve 20 and plug 22 so that the mutually opposed surfaces of plug 22 and mixer duct 24 define a generally rearward extension of the turbine outlet 14 and the mutually opposed surfaces of sleeve 20 and mixer duct 24 define a rearward extension of the fan duct outlet 16.

With reference to FIG. 2, mixer duct 24 extends rearwardly to an end 26 disposed approximately midlength of assembly 11. End 26 of duct 24 generally defines a mixing plane that extends transversely of the assembly as indicated by dotted line 28 where the gases from the primary flow and air from the fan flow intersect to commence the mixing process. The mixing continues as the primary gases and air flow rearwardly into and through nozzle 13. By the time that the flows are discharged from nozzle end 15 (FIG. 5) a significant degree of mixing has taken place.

Bulb-shaped plug 22 has a neck portion 32, the forward end of which is connected to a cylindrical fairing 34 extending from a hub (not shown) of the engine's turbine. The exterior surface of fairing 34 makes a smooth transition with the exterior surface of the neck portion 32 of plug 22 so that no surface discontinuity is presented to the primary flow in this region. The cross section of plug 22 varies rearwardly from neck portion 32, first flaring outwardly to a maximum cross section at girth 36 so as to define an offset portion 37 adjacent to plug's forward end, and thereafter reducing at a substantially constant rate to define an aft tapered portion 38 that terminates in a blunt aft end 40.

As shown in FIG. 5, the increase $\Delta h$ in the radial dimension of offset portion 37 over the axial distance L is such that the surface of plug 22 in this region diverges radially outwardly and rearwardly at an angle, a, relative to the centerline of the plug. The surface of the plug in the region of tapered portion 38 converges radially inwardly and rearwardly at an angle $b_1$. The maximum cross section, at girth 36 of plug 22, is located near the midpoint of the length of sleeve 20 and slightly forward of end 26 of duct 24.

Figure 3:
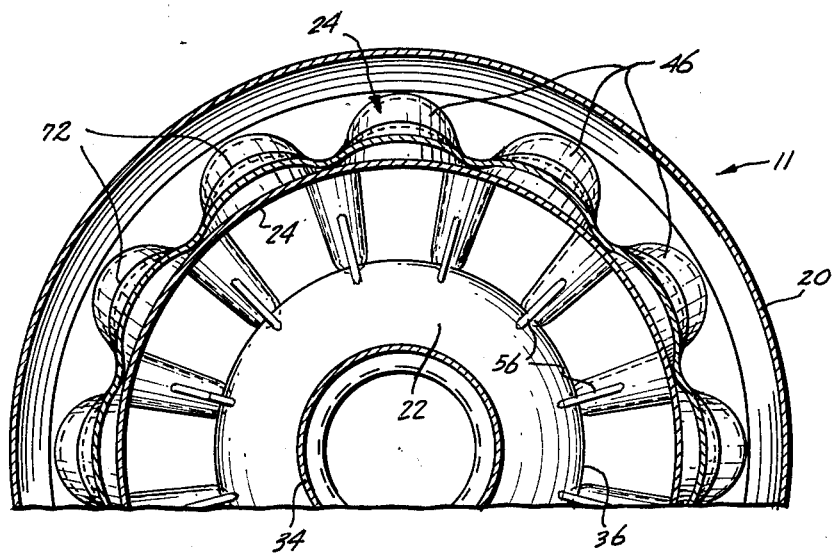
FIG. 3 is a transverse sectional view of the mixer assembly of FIG. 1 taken along section line 3—3 of FIG. 2.
Figure 4:
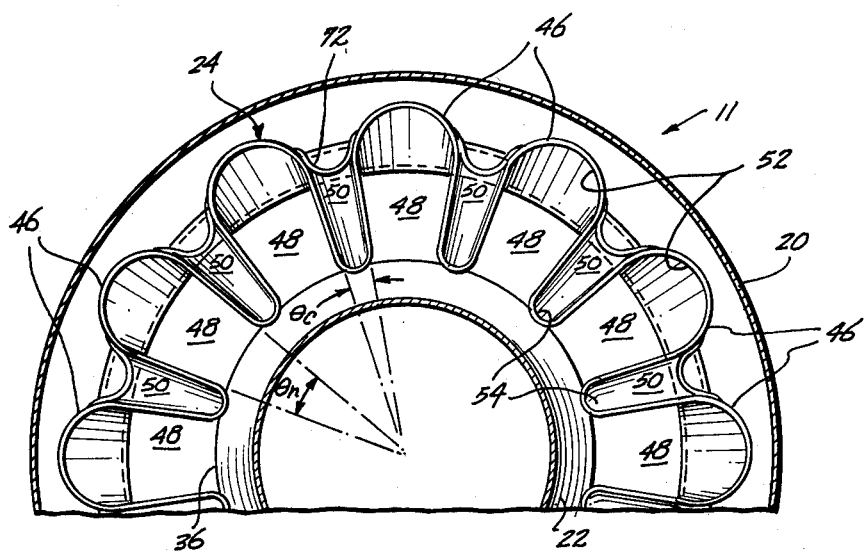
FIG. 4 is another transverse sectional view of the mixer assembly of FIG. 1 taken along section line 4—4 of FIG. 2.

With reference to FIGS. 1-4, mixer duct 24 is formed with axially oriented corrugations 46 (FIG. 4) that commence adjacent a forward end 44 (FIG. 2) at which duct 24 is of cylindrical shape, and increase in their radial dimension with increasing rearward position. As is known, per se, corrugations 46 increase the degree of mixing of the primary and fan flows by channeling the flows into circumferentially alternately arranged channels that enhance the communication between the two flows as they meet at mixing plane 28. With particular reference to FIGS. 2 and 4, the radially interior surfaces of corrugations 46 define together with plug 22 a plurality of circumferentially spaced apart primary flow channels 48 that are disposed for receiving the primary flow from turbine outlet 14. Similarly as shown in FIGS. 2 and 4, the opposite and radially exterior surfaces of duct 24, define together with sleeve 20 a plurality of circumferentially spaced apart flow channels 50 that alternate with channels 48. Channels 50 are arranged for receiving the fan flow from the fan outlet duct 20 as depicted in FIG. 2.

Corrugations 46 of duct 24 are formed such that wall portions 52 (FIGS. 2 and 4) that define the radially outermost boundaries of primary flow channels 48 are contoured so that starting from a forward end of duct 24, wall portions 52 initially slope rearwardly and radially outwardly to match the divergence of offset portion 37 of plug 22 and then smoothly curve rearwardly and inwardly adjacent end 26. The resulting shape of duct 24 causes the bulk of the primary flow to be rearwardly divergent at end 26 of the duct, yet maintains the rearward momentum of the flow by rechanneling the radially outermost extent of such flow with the rearwardly and inwardly curved wall portions 52 adjacent end 26 to initiate a return of the flow to a principally rearward direction. At progressively rearwardly located transverse sections, the area of the primary flow channels 48 between wall portions 52 and plug 22 remain generally constant.

Similarly, wall portions 54 (FIGS. 2 and 4) of corrugations 46 that define the radially innermost boundaries of fan flow channels 50 (FIG. 4) are sloped so as to converge rearwardly and radially inwardly and thus have oppositely oriented slopes relative to those parts of wall portions 52 that are radially opposed to offset portion 37.

As shown in FIG. 5, the convergence of wall portions 54 makes an angle $b_2$ with respect to the centerline of assembly 11, and angle $b_2$ is made to be substantially equal to the angle $b_1$ of the tapered portion 38 of plug 22. By making angles $b_1$ and $b_2$ substantially equal and by positioning the aft end 26 of duct 24 proximate to and slightly aft of the maximum girth 36 of plug 22, taper portion 38 of the plug is aligned with and forms a continuation of the radially intermost boundaries of fan flow channels 50 defined by duct wall portions 54.

Duct 24 is fabricated of sheet metal and to provide support for its relative thin wall, faired struts 56 are provided, each extending generally radially between plug 22 and a wall portion 54 of corrugations 46, at axially intermediate locations of duct 24 and plug offset portion 37.

In order to attach assembly 11 to end 12 of the engine, neck portion 32 of plug 22 is bolted to a flange (not shown) on cylindrical fairing 34 that extends from the hub of the turbine. Sleeve 20 is formed with a radially outwardly projecting and circumferentially extending mounting flange 60 that mates with and is bolted to a similar flange 62 provided at end 12 of the engine housing 64. Duct 24 is provided with a radially outwardly projecting mounting flange 66 that is bolted to an end 68 of the turbine housing 70. Because an annular separation exists between the turbine outlet 14 and the fan duct outlet 20 due to the intervening housing 70, it has been found desirable to provide a transition duct 72 that is of generally annular shape and has a flange 74 that is bolted along with flange 66 of duct 24 to the end 68 of turbine housing 70. Duct 72 provides a smooth air flow transition between fan duct outlet 20 and the plurality of fan flow channels 50 of duct 24. For this purpose duct 72 is formed with shallow corrugations 73 that nest snugly with the forward portions of the corrugations 46 of duct 24.

The operation of assembly 11 is best explained with reference to the diagrammatic illustration in FIG. 5. As shown therein, rearward primary flow, indicated by arrows 80, is received by assembly 11 and the radial offset 37 of plug 22 and the matching contouring of wall portions 52 of duct channels 48 redirect the bulk of this flow such that when it is discharged from end 26 of duct 24 the primary gases are rearwardly divergent and thus have a radially outwardly directed component of momentum.

On the other hand, the rearward fan flow indicated by arrows 82 is received by assembly 11 and the bulk of the fan flow is redirected by duct channels 50 so that when it is discharged from duct end 26 the bulk of the fan air is rearwardly convergent and thus has a radially inwardly directed component of momentum. As these two flows emerge from the rear end 26 of duct 24, they intersect and mixing begins. By virtue of the intersection of the primary and fan flows a vortex motion is imparted to the gases and air which aids in the mixing process. This vortex motion takes the form of swirl patterns revolving about the centerline of the assembly 11 and nozzle 13. The magnitude of the angle of intersection between the rearwardly divergent primary flow and the rearwardly convergency fan flow determines in part the degree of mixing of the gases and air that occurs before they are discharged from nozzle 11 at its aft terminus 15.

In the construction of nozzle 11 in accordance with the present invention, it has been found possible to make this angle of intersection much larger than thought possible (for optimum mixing), before secondary flow develops and causes thrust robbing pressure loses. The relatively large magnitude of the angle of intersection between flows 80 and 82 is achieved by the combined effects of redirecting the primary flow to give it a radially outwardly directed momentum component and of redirecting the fan flow to give it a radially inwardly directed momentum component.

A large angle of intersection is thus obtained without creating undue pressure losses in either flow channel, such as would occur if an attempt were made to achieve the same angle of intersection by redirecting only one of the flows. Also, the slope angle $b_1$ of tapered portion 38 of plug 22 is matched to the angle $b_2$ of wall portions 54 of the fan flow channels 50 so that the fan flow 82, as it emerges from end 26 of duct 24, immediately fills any pressure voids that might occur adjacent the surface of tapered portion 38 of the plug. Such pressure voids, which cause secondary flows, will develop in the absence of the redirected fan flow because of a tendency of the radially outwardly redirected primary flow 80 to separate from the surface of plug 22 as flow 80 crosses girth 36 and encounters tapered portion 38.

Corrugations 46 of duct 24 terminate at end 26 defined along duct edge portions that diverge radially outwardly and rearwardly. In particular, end 26 is defined by the intersection of the corrugations 46 of duct 24 and an imaginary cone coaxially disposed with respect to the centerline of the assembly and having a slope that makes an angle $\gamma$ with respect to a transverse plane. The larger the angle $\gamma$ is, the more effective the inwardly curved wall portions 54 of duct 24 adjacent end 26 are in rechanneling the outward divergence of the primary flow, but the less effective is the mixing.

By way of example, the stated advantages of assembly 11 have been obtained in an embodiment in which: mixer duct 24 is formed with a plurality of 12 corrugations 46; $\theta_h = 18°$ (angle subtended by primary flow channels 48 of corrugations 46 as shown in FIG. 4); $\theta_c = 12°$; (angle subtended by fan flow channels 50 of corrugations 46 as shown in FIG. 4); angles $b_1 = b_2 = 22°$; angle $a = 20°$ ($h/L \times 100 = 36\%$); $X/W \times 100 = 80-90\%$; and $\gamma = 16°$. The corrugations 46 are sometimes called lobes. The ratio $X/W$ is sometimes referred to as the measure of penetration and reflects the degree to which the primary and fan flows are forced to penetrate one another as they exit from end 26 of duct 24.

Obviously the foregoing dimensions can be varied while still obtaining the results contemplated by the invention. However, for preferred results it is believed that certain of the above parameters should be held within specified ranges. In particular the $\gamma$ should be within the range of 12°–22°, inclusive. Angles $b_1$, $b_2$ should be within the range of 18°–26°, inclusive. Angle, a, should be within the range of 16°–24°, inclusive.

The foregoing detailed description of one preferred embodiment of the invention has been set forth solely to provide a complete teaching of the invention and not with the intent to limit the scope of the invention. Many modifications to the foregoing embodiment will occur to persons familiar with the art and such modifications are not considered to depart from the spirit and scope of the invention as defined by the following claims.

What is claimed is:

1. A mixer assembly for suppressing noise emanating from the exhaust of a ducted-fan turbojet propulsion engine of the type having an exhaust end for receiving said assembly which defines an annular turbine outlet and an annular fan duct outlet, said fan duct outlet coaxially surrounding said turbine outlet, and said assembly comprising:
   a sleeve, a bulb-shaped plug having an axis of symmetry and being disposed coaxially within said sleeve so that the exterior surface of said plug is spaced radially inwardly from the interior surface of said sleeve, a mixer duct of generally annular shape disposed coaxially between said plug and said sleeve, and said sleeve, plug and mixer duct having concentric, radially spaced apart forward ends adapted for attachment to the exhaust end of the engine so that said plug and said mixer duct define therebetween a rearward extension of said turbine outlet and such that said mixer duct and said sleeve define therebetween a rearward extension of said fan duct outlet;

said plug having a neck portion at its forward end and having a circular cross section that varies in diameter along the axis of said plug between said neck portion and a rear end of said plug, said circular cross section first increasing in diameter to the rear of said neck portion to form a radially outwardly flared offset portion that diverges rearwardly and terminates at a circular cross section of maximum diameter, said circular cross section thereafter decreasing in diameter to form an aft tapered portion that converges radially inwardly and rearwardly and terminates at said rear end of said plug;

said mixer duct being formed with corrugations that are oriented parallel to the axis of said duct, said corrugations commencing at the forward end of said mixer duct and generally increasing in radial dimension toward the rear end of said mixer duct, said corrugations of said mixer duct defining first and second sets of channels, the first set of channels being defined between mutually opposed surfaces of said mixer duct and said plug and said second set of channels being defined between mutually opposed surfaces of said mixer duct and said sleeve, and channels of said first set alternating circumferentially with channels of said second set, said mixer duct being sized and arranged relative to said plug such that said first set of channels are in radial registration with said offset portion of said plug and such that the radially outermost boundaries of said first set of channels diverge radially outwardly and rearwardly substantially matching the rearward divergence of said offset portion of said plug such that said first set of channels redirects primary flow from the turbine outlet causing such flow to diverge radially outwardly and rearwardly, said mixer duct being sized and arranged relative to said sleeve such that the radially innermost boundaries of said mixer duct that define said second set of channels slope radially inwardly and rearwardly at a slope that generally matches an angle of convergence of the tapered portion of said plug, said second set of channels redirecting the fan flow to cause it to converge radially inwardly and rearwardly and to intersect with the primary flow at an angle of intersection that substantially equals the sum of the angle of divergence of the primary flow and of the angle of convergence of the fan flow, and said radially innermost boundaries of the mixer duct that define said second set of channels being generally aligned with the tapered portion of said plug so that fan flow exiting from said second set of channels flows along said tapered portion of said plug and thereby inhibits the formation of pressure voids along said tapered portion of said plug due to a tendency for the primary flow to separate from the surface of said plug as the primary flow passes across the maximum diameter cross section of the plug.

2. A mixer assembly for suppressing noise emanating from the exhaust of a ducted-fan turbojet propulsion engine wherein the assembly is of the type that has a sleeve, a plug concentrically disposed within the sleeve and a generally annular, corrugated mixer duct coaxially arranged between the plug and sleeve and wherein the assembly is connected to the engine to receive and mix primary flow from a turbine outlet with fan flow from a fan duct outlet, and wherein the improvement comprises:

said sleeve, plug and mixer duct being so shaped and arranged so as to receive rearwardly directed primary flow from the turbine outlet and to redirect the bulk of such primary flow so that it diverges radially outwardly and rearwardly, and so as to receive fan flow from the fan duct outlet and to redirect the bulk of the fan flow so that it converges radially inwardly and rearwardly and intersects the radially outwardly and rearwardly diverging primary flow at an angle of intersection that substantially equals the sum of the angle at which the primary flow diverges from the axis of the assembly and of the angle at which the fan flow converges toward the axis of the assembly to maximize mixing of the primary flow with the fan flow with minimal disruption of the rearward momentums of such flows; and wherein said plug is bulb-shaped and is disposed coaxially with said sleeve and is contoured with respect to its axis to define a neck portion at its forward end which is followed by a rearwardly flared radial offset portion that terminates generally midlength of the plug at a cross section of maximum diameter which in turn is followed by a tapered portion that terminates at an aft end of said plug, and wherein said mixer duct is disposed so as to be radially outwardly spaced from and in radial registry with said offset portion of said plug and is so shaped and arranged together with said offset portion of said plug so as to form a plurality of primary flow channels that cause the redirection of the bulk of the primary flow so that it diverges radially outwardly and rearwardly, and wherein said mixer duct is disposed to be radially inwardly spaced from said sleeve and is shaped and arranged to form together with said sleeve a plurality of fan flow channels that cause the redirection of the bulk of the fan flow so that it converges radially inwardly and rearwardly, said fan flow channels being oriented relative to said tapered portion of said plug so that the bulk of said fan flow as it exits from said mixer duct flows along the surface of said tapered portion of said plug to inhibit the formation of pressure voids therealong due to separation of the primary flow from the surface of the plug as the primary flow passes across the maximum diameter cross section of said plug and tends to diverge away from the tapered portion of the plug.

3. The assembly of claim 2 wherein said mixer duct has corrugations that are oriented parallel to the axis of the assembly, said corrugations generally increasing in radial dimension from the forward end toward the aft end of said mixer duct, said corrugations together with said offset portion of said plug defining said plurality of primary flow channels and said corrugations of said mixer duct together with said sleeve defining said plurality of fan flow channels, and the portions of said corrugations of said mixer duct that define the radially innermost boundaries of said fan flow channels being shaped to slope radially inwardly and rearwardly at an angle $b_2$ relative to the axis of said assembly that substantially equals the angle $b_1$ that the tapered portion of said plug makes with respect to the axis of said assembly and said mixer duct being arranged so that said portions of said corrugations that define the radially innermost boundaries of said fan flow channels are aligned with said tapered portion of said plug.

4. The assembly of claim 3, wherein said angles $b_1$ and $b_2$ are within the range of 18° – 26°, inclusive, and wherein said offset portion of said plug flares away from the axis of the assembly at an angle, a, that is in the range of 16° – 24°, inclusive.

5. The assembly of claim 2, wherein said mixer duct has corrugations that are oriented parallel to the axis of the assembly, said corrugations generally increasing in radial dimension from the forward end toward the aft end of said mixer duct, said corrugations together with said offset portion of said plug defining said plurality of primary flow channels and said corrugations of said mixer duct together with said sleeve defining said plurality of fan flow channels, said mixer duct having an aft terminus defined along rear edges of said corrugations and the racially outermost portions of said corrugations adjacent said rear edges being curved rearwardly and inwardly.

6. The assembly of claim 5, wherein said aft terminus of said mixer duct is disposed aft of said maximum diameter cross section of said plug.

7. The assembly of claim 5 wherein the rear edges of said corrugations of said mixer duct generally lie along the intersections of said corrugations with an imaginary cone located coaxially with respect to the assembly and diverging rearwardly so as to make an angle $\gamma$ with respect to a plane extending transversely to said assembly.

8. The assembly of claim 7, wherin said angle $\gamma$ is within the range of 12° – 22°, inclusive.

* * * * *